Figure 1:
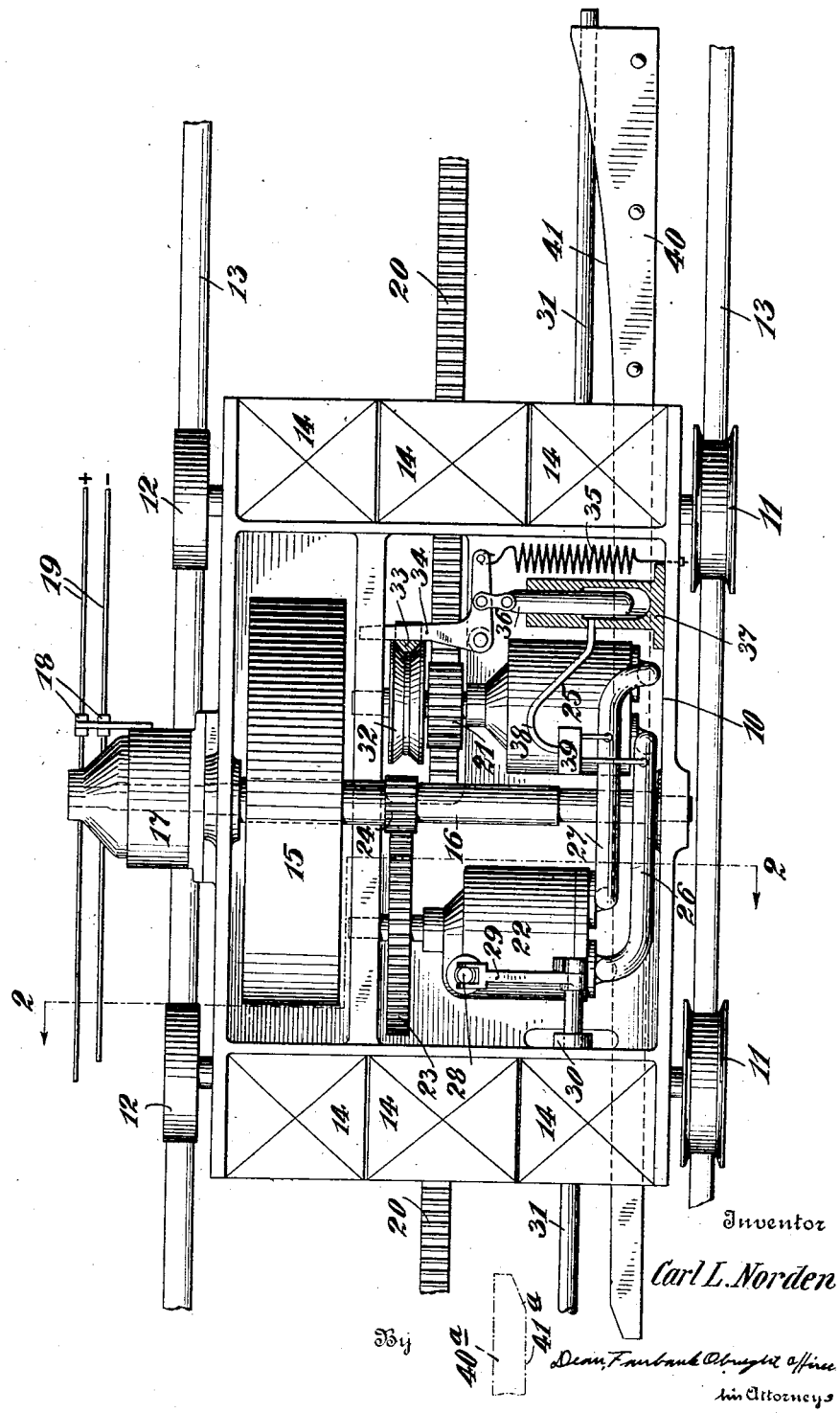

April 9, 1929.  C. L. NORDEN  1,708,679
SHIP STABILIZER
Filed Aug. 23, 1922  7 Sheets-Sheet 1

April 9, 1929.  C. L. NORDEN  1,708,679
SHIP STABILIZER
Filed Aug. 23, 1922   7 Sheets-Sheet 2
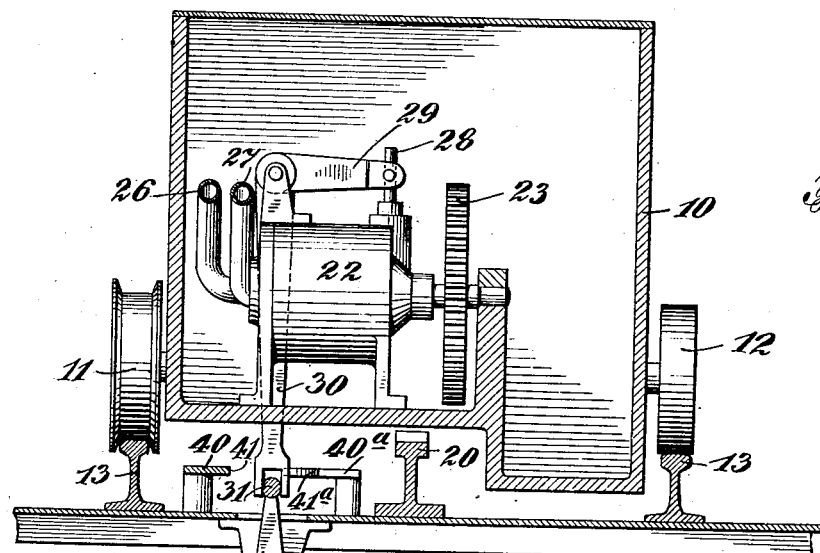
Fig. 2.
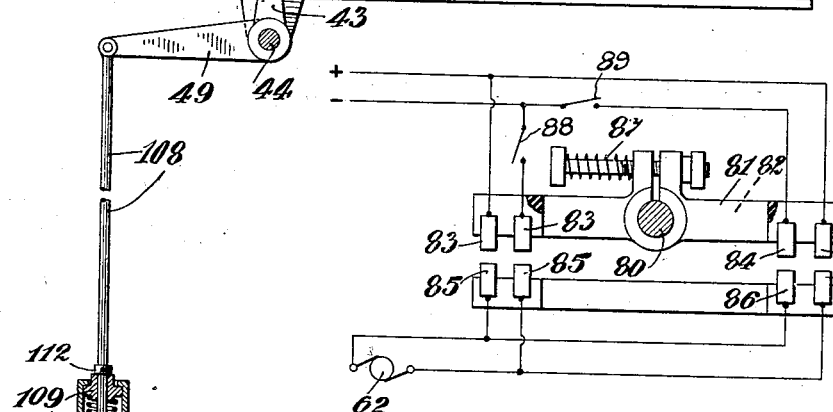
Fig. 11.
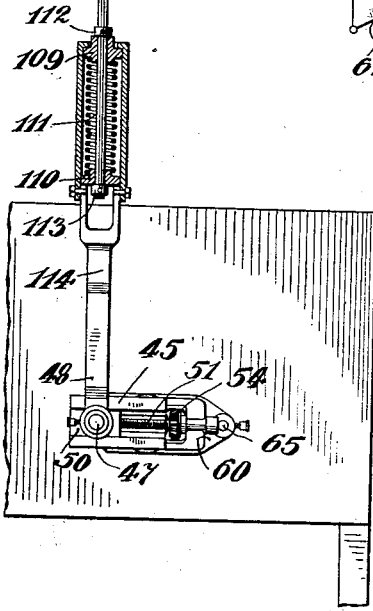
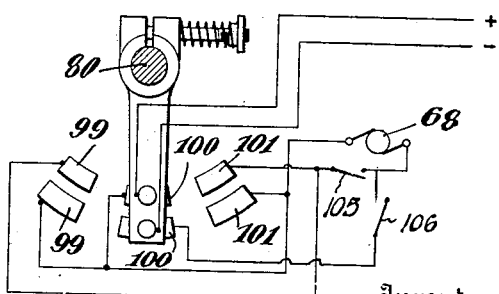
Fig. 12.
Inventor
Carl L. Norden
By Dean Fairbank Chrysler & Hire
his Attorney.

April 9, 1929.　　C. L. NORDEN　　1,708,679
SHIP STABILIZER
Filed Aug. 23, 1922　　7 Sheets-Sheet 3

Inventor
Carl L. Norden
By Dean, Fairbank, Obright & Hirsch
his Attorneys

April 9, 1929.  C. L. NORDEN  1,708,679
SHIP STABILIZER
Filed Aug. 23, 1922   7 Sheets-Sheet 4

Inventor
Carl L. Norden
By Dean Fairbank Abright & Hirsch
his Attorneys

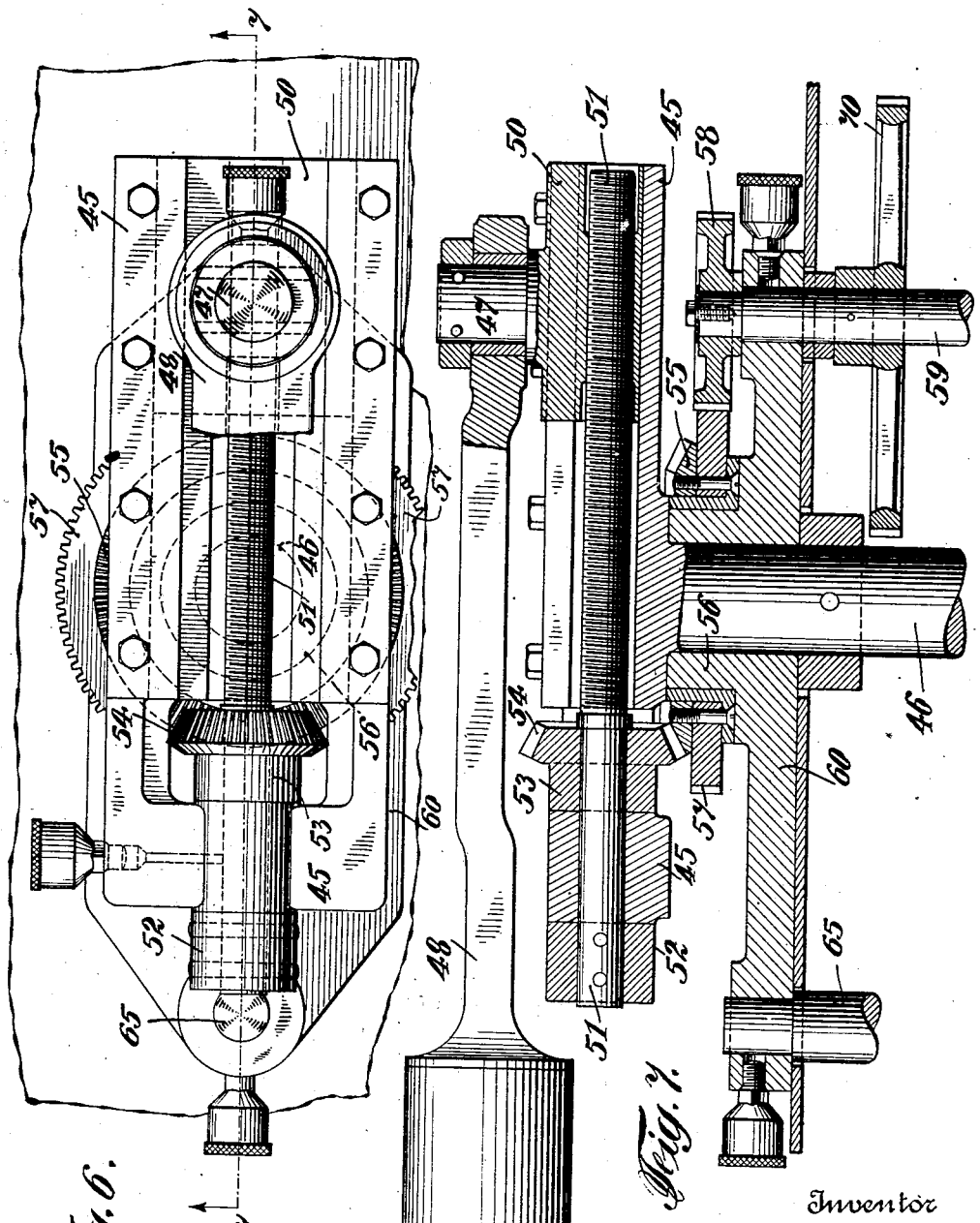

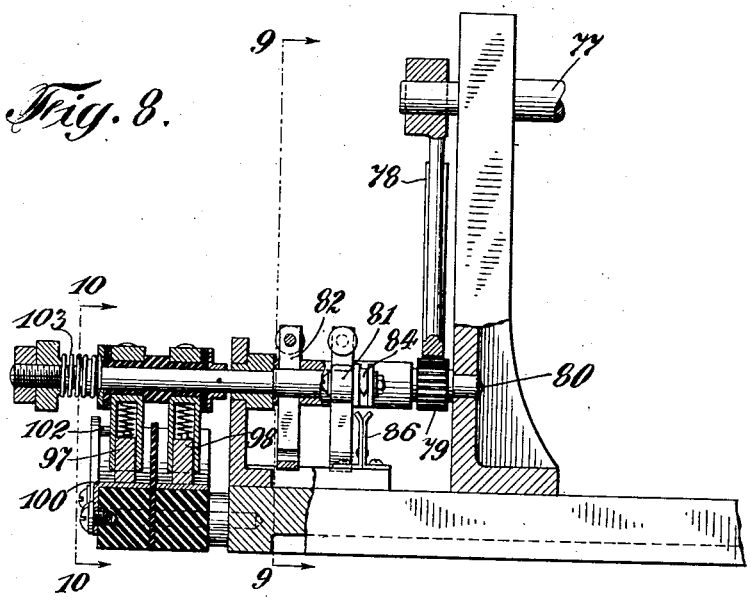
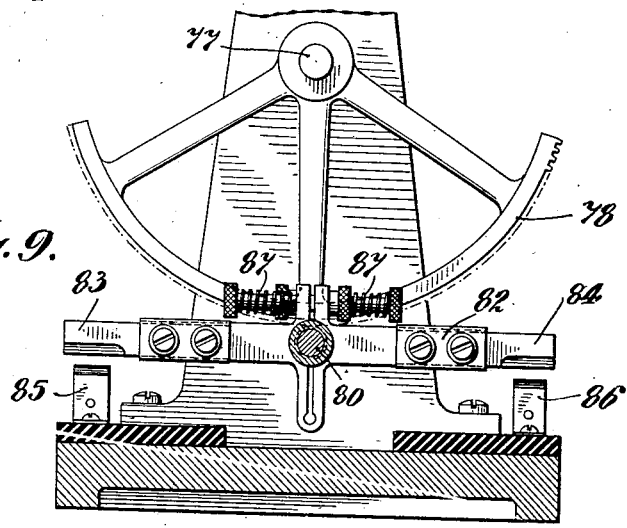
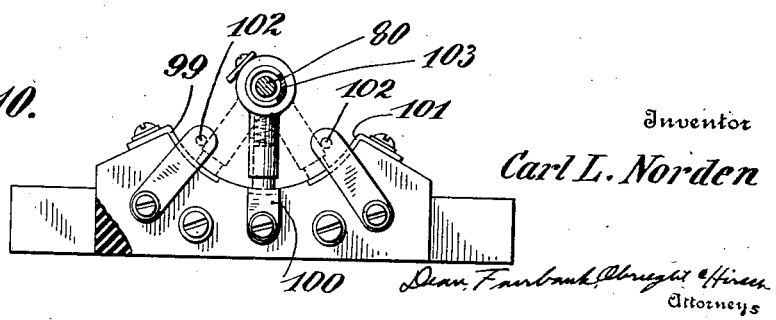

Patented Apr. 9, 1929.

1,708,679

UNITED STATES PATENT OFFICE.

CARL L. NORDEN, OF BROOKLYN, NEW YORK.

SHIP STABILIZER.

Application filed August 23, 1922. Serial No. 583,688.

The main result which I seek to accomplish by means of my invention is the effective control of the roll of a vessel by the use of a weight shiftable back and forth athwartship under accurately and positively controlled conditions. Attempts which have been made heretofore to use shifting weights to control athwartship motion have not met with complete success, primarily due to the comparatively large weight of the shifting mechanism and difficulties in securing effective control of the shiftable weight.

As one important feature of my invention I impart to the active stabilizing weight simple harmonic motion athwartship and of controlled and variable amplitude in the period of the vessel's roll.

The following are among other important features of my invention, all of which are preferably employed, but some of which may be omitted in some embodiments of the invention. I rigidly control the athwartship motions of the active weight, in the sense that the active weight is at all times positively coupled to the vessel by non-yielding means, so that no movement of the weight is possible except by the direct and positive action of the controlling mechanism. I mount the active stabilizing weight on a suitable guideway so that it may move athwartship toward either side from the center line to the desired and controlled distance and at the desired and controlled speed, acceleration and deceleration. I employ a high speed rotor or fly wheel as the source of power or power storage element for controlling, compelling or causing the desired velocity and amplitude of travel of the stabilizing weight. I couple the active or stabilizing weight to the vessel by gearing, including a rotatable element which may be operated from the power element. Such gearing may be in the form of rack and pinion, drum and endless wire rope, screw spindle or the like. I couple the weight, vessel and power element by a variable speed gear which controls the rotation, speed and direction of the aforementioned gear element whereby the gear element may be operated from the power element to start, accelerate, decelerate, stop, reverse or lock the weight. Although the fly wheel or other power element and the variable speed gear may be mounted in any suitable position on board ship for controlling the movement of the active weight through the control of the gear element, I preferably, and as one important feature of the invention, utilize the mass of the fly wheel and variable speed gear by making them bodily movable athwartship, and as a part of the active stabilizing weight. Although the variable speed gear may vary in character in different embodiments of my invention, I preferably, and as an important feature, employ a variable stroke hydraulic speed gear capable of gradual changes in speed, rapid acceleration and deceleration, and changes in direction by means of an appropriate movement of a controlling member such as a gear or spindle. By use of such variable speed gear, the direction, extent and speed of movement of the spindle determines the direction, speed, and acceleration or deceleration of the active weight athwartship, and the energy required for moving or accelerating and yielded by decelerating, retarding or stopping the weight, is supplied by or absorbed by the rotor.

In the use of a fly wheel rotor I do not wish to be limited to any specific means for establishing or maintaining the rotor speed. The rotor may be brought to the desired and definite speed by an electric motor or other prime mover and its speed may thereafter be maintained by such motor or it may be given an initial impulse or starting speed and derive further energy from the effect of the roll on the active weight. In some instances the motor may be omitted altogether. The rotor may have any suitable means, such as an automatic governor, for limiting its speed.

In case the primary controlling apparatus including the rotor or power element, and the variable speed hydraulic gear, be incorporated as a part of the active weight and thus be movable back and forth athwartship, I provide as an important feature, means whereby the control spindle of the variable speed gear may be operated at any desired speed and to any desired position, while the active weight, including the variable speed gear, is traveling athwartship or is in any position along the guideway. I provide means for limiting the maximum amplitude of movement of the weight automatically and gradually bringing it to a stop by means positioned in the path of movement and acting on the harmonic principle for centralizing the hydraulic gear controlling element to neutral position as the weight approaches and reaches its limiting position. With the controlling element of the variable speed gear in neutral position, the weight must of necessity be stationary.

In addition to the automatic amplitude limit feature, I provide an automatic brake for the active weight. This may be designed to act only when the torque of the speed gear exceeds the minimum required to produce the harmonic force causing the desired motion of the active weight. As the oil pressure of the hydraulic gear is proportional to the torque, this pressure, when exceeding the determined maximum may act directly or indirectly to apply the brake, and such excessive torque and pressure may act irrespective of whether the power being transmitted moves the active weight or the movement or momentum of the weight acts reversely to store energy in the fly wheel. Another form of automatic brake may utilize a separate controlling weight or mass mounted substantially stationary on the vessel and subject to acceleration pressure due to and proportional to the braking force exerted upon the active weight or some part of its primary control which may at any time be equal to or proportional to the accelerating forces acting on the active weight because of the roll. Such a brake eliminates the effect of the roll upon the active weight so that the primary control would at any time only control the harmonic and friction force, regardless of the roll. If the primary control should break or be removed this brake would hold the active weight in any position along its guideway during any roll. Thus there is secured maximum safety with a relatively small speed gear. The brake may be mounted on the vessel or incorporated in part with the active weight.

The means for actuating the controlling element of the gear when the active weight is at any point along its path and traveling at any speed, to control the speed and direction of the active weight, may be operated manually if desired, but preferably it is operated automatically by a secondary control. In the control of the active weight I secure motions of the weight which are a function of the roll of the vessel which is to be stabilized, both as to phase and amplitude. As the roll of the vessel itself is approximately an angular simple harmonic motion, I give to the controlling element or spindle of the hydraulic gear a corresponding linear or angular simple harmonic motion of variable amplitude, reversing when the ship starts to right itself. In order that the vessel's angular athwartship motion may be utilized for the actuation of the controlling spindle of the hydraulic gear, I provide a Cardan mounted on the fore and aft axis and stabilized for this axis by means of one or more gyroscopic rotors. The motion of the vessel against the Cardan thus gives the roll of the vessel in momentary angular velocity of roll as well as in amplitude and is used to actuate the secondary control.

In order that the active weight may operate most efficiently, it should pass its midship position the instant the vessel passes through even keel position after completing a roll to one side and when about to begin a roll to the other side, and thereafter decrease its speed harmonically. Therefore I provide means for reversing the motion of the control spindle at that instant and start it toward neutral position. When the vessel passes through its upright position the active weight should reverse its motion, and said means operates at that instant to move the control spindle through its neutral position. As the Cardan performs an angular harmonic motion relatively to the vessel and the control spindle of the hydraulic gear is given a harmonic motion to control the active weight, various means may be provided for operating the spindle from the Cardan. These may include a crank actuated by servo-power, for instance a constant speed reversible electric motor controlled by the Cardan motion by means of contacts. This may give the true linear harmonic motion to the spindle, as the projection of a crank traveling at constant speed performs such a motion. Instead, the Cardan may be coupled directly to the control spindle by suitable servo-power.

As another important feature I control the amplitude of the active weight in accordance with the amplitude of the vessel's roll, centering the weight when the roll is small. In case crank control of the hydraulic gear spindle is used, I provide an averaging amplitude control of the spindle which operates to vary the crank radius in accordance with the amplitude of roll of the ship. As there is a maximum possible amplitude for the active weight, I utilize this maximum amplitude for a predetermined angle of roll of the vessel, as for instance 5°, and utilize the maximum crank throw or radius of the crank during any roll of the ship at or in excess of 5°. As soon as the amplitude of the roll falls below the predetermined angular limit, for instance 5°, the crank throw or radius is automatically decreased and the crank starts to center at a definite rate. When the roll falls below a further limit, for instance 3°, this centering motion may be accelerated. The maximum rate of centering is such that this motion extends over a full period of roll.

In case the angular motion of the Cardan is used for the secondary control, the motion of the control spindle is made proportional to the roll up to for instance 3°, when maximum amplitude is obtained, and for any larger roll the leverage is automatically reduced to that of 3°.

My invention involves various other features of importance which are incorporated in a preferred embodiment hereinafter illustrated. As the character of the vessel, position of installation thereon, and other factors vary, it will be evident that apparatus may be designed embodying my invention without incorporating all of the several features hereinbefore referred to.

In the accompanying drawings:—

Figure 3:
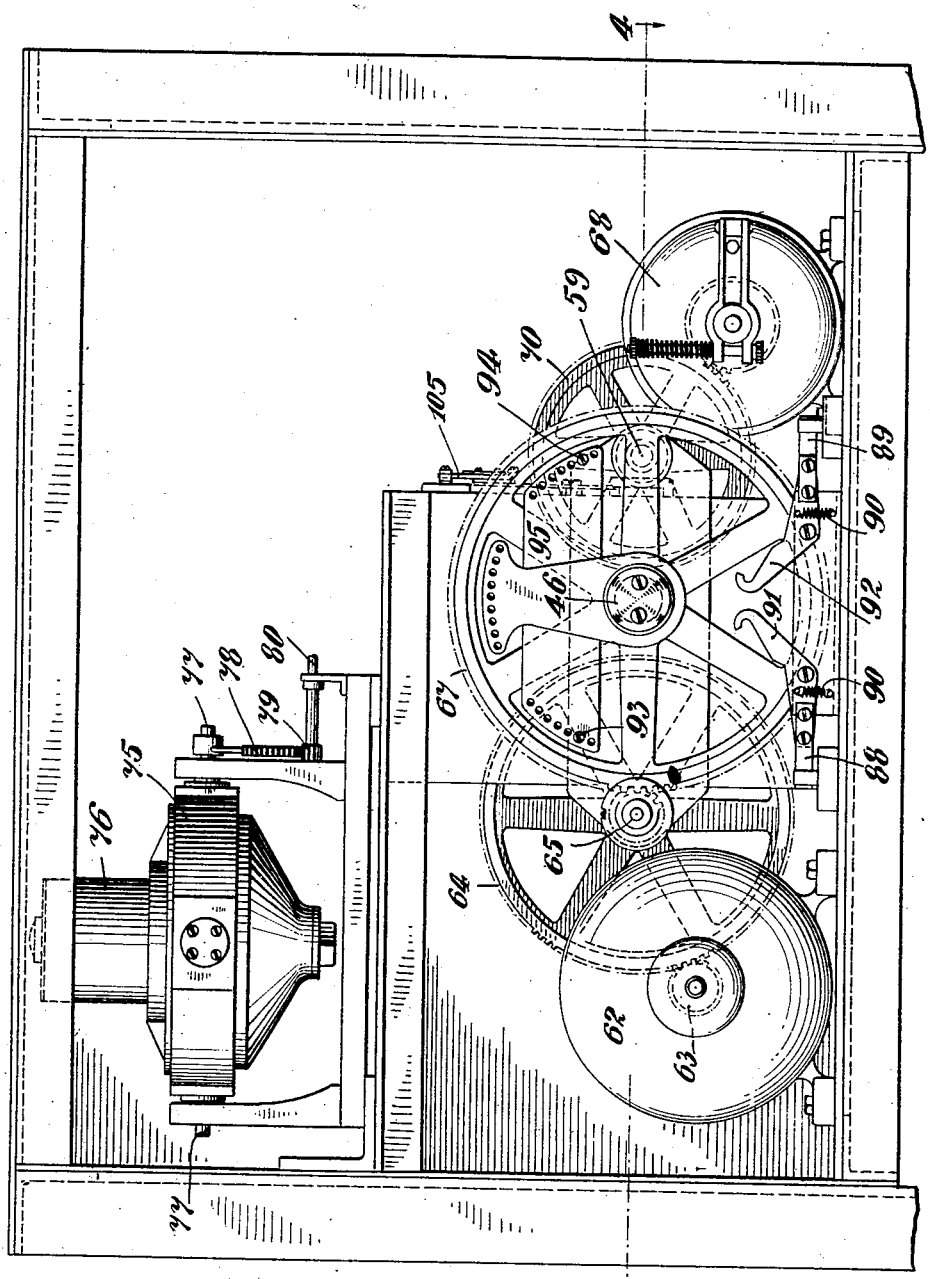
Figure 4:
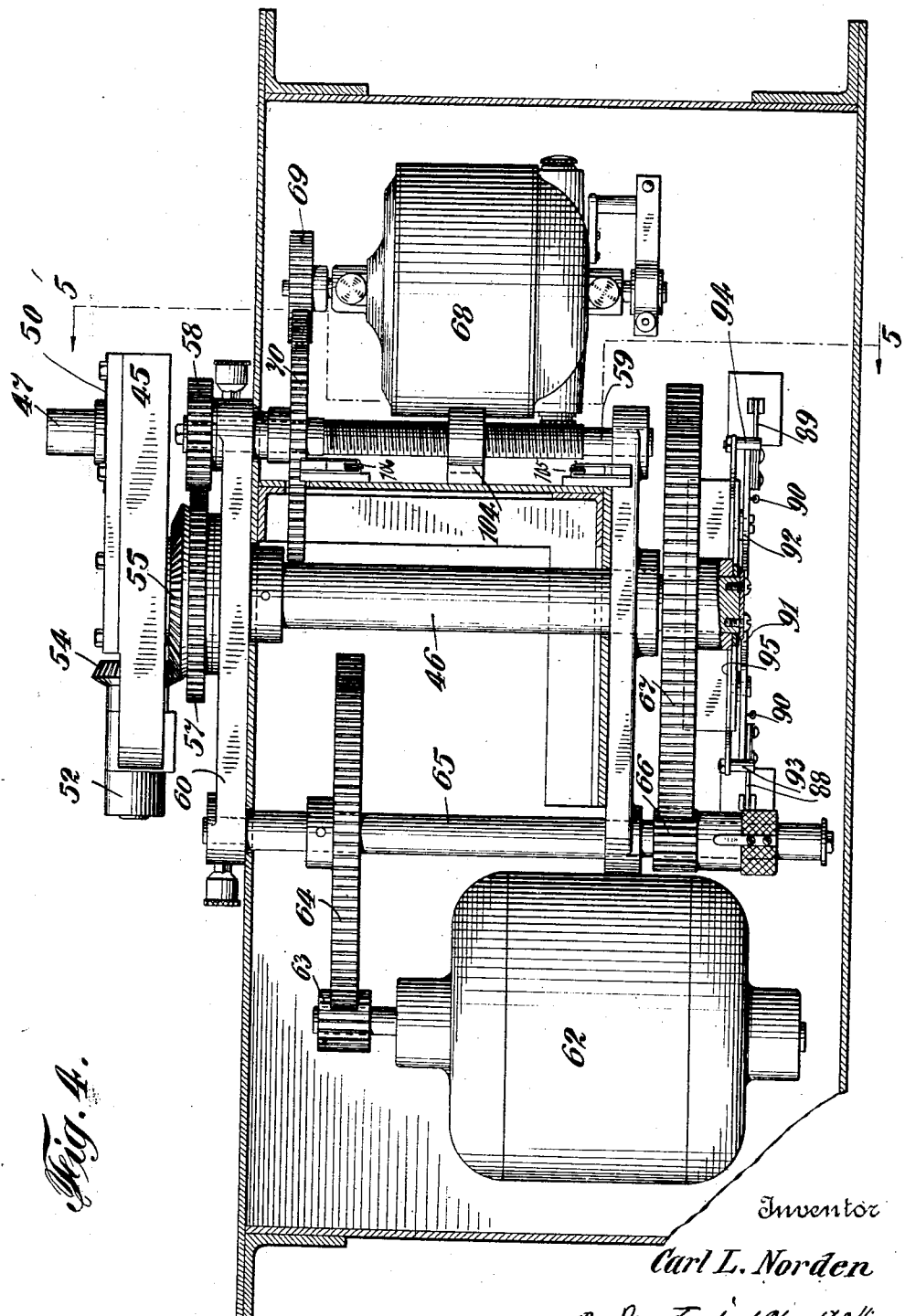
Figure 5:
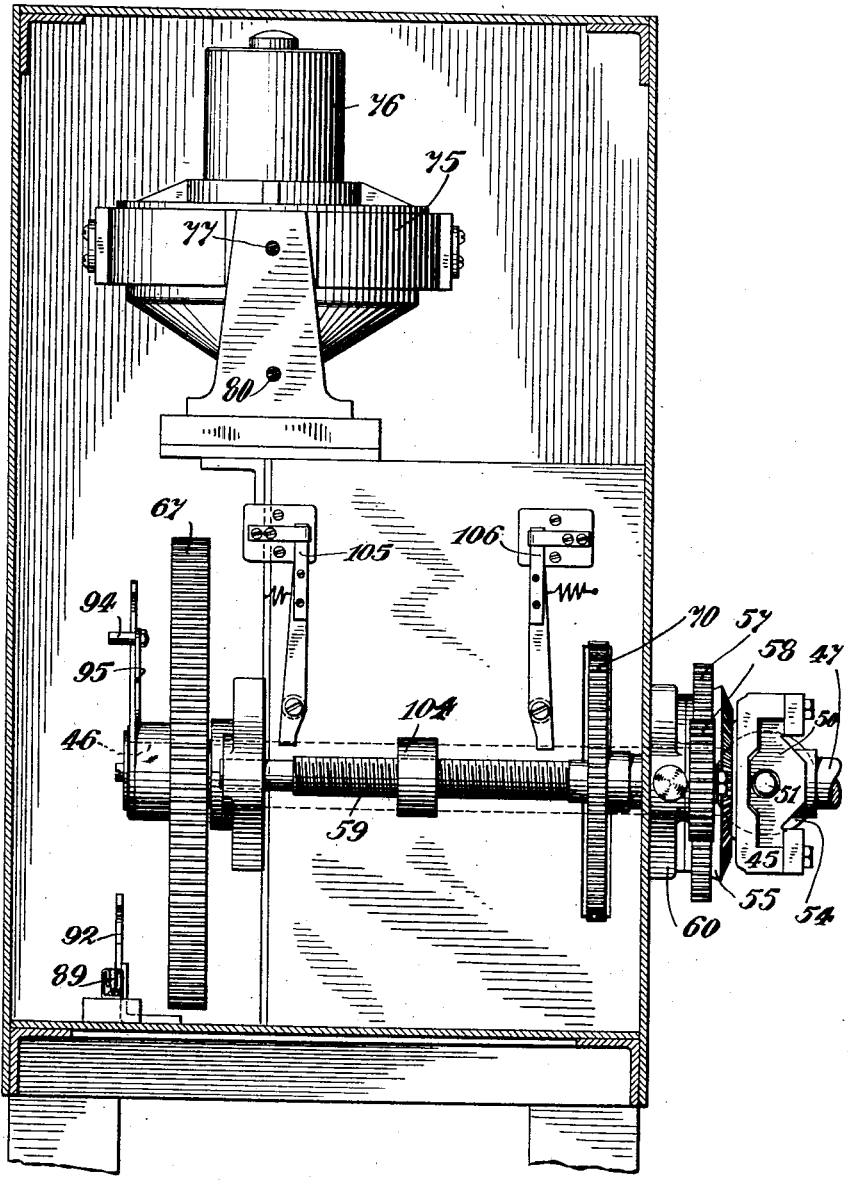

Fig. 1 is a top plan view of the active weight, or athwartship movable body, and certain of the parts directly associated therewith, Fig. 2 is a transverse section substantially on the line 2—2 of Fig. 1, and showing a part of the primary control, Fig. 3 is a front elevation of certain of the parts forming the secondary control, Fig. 4 is a horizontal section taken substantially on the line 4—4 of Fig. 3, Fig. 5 is a vertical section substantially on the line 5—5 of Fig. 4, Fig. 6 is a face view of the variable throw crank shown on a very much smaller scale in Fig. 2, Fig. 7 is a section substantially on the line 7—7 of Fig. 6, Fig. 8 is a vertical section through the control switches for the servo-motors, these parts being omitted from Figs. 3 and 4, Figs. 9 and 10 are sections substantially on the lines 9—9 and 10—10, respectively of Fig. 8, Fig. 11 is a wiring diagram of the circuit for the main crank operating servo-motor and including the switches shown in Fig. 9, and Fig. 12 is a wiring diagram for the circuit for the motor which varies the throw of the crank, and including the switches shown in Fig. 10.

In Figs. 1 and 2 I have shown a type of active weight which includes the primary control as a part thereof. It is to be understood that the illustration of the parts in Figs. 1 and 2 is semi-diagrammatic in that the positions, relative sizes and details of construction are selected in the interest of clear illustration of the main and essential features. In practice each part would be designed in accordance with the work required of it, and the parts possibly rearranged in the interest of compactness, etc.

The active weight is illustrated as a car 10 having pairs of supporting wheels 11 and 12 mounted on a track 13 extending athwartship. This track may be on any desired deck or between decks, although a somewhat increased effect is obtained by placing the track on one of the upper decks, as distinguished from a lower one. The track may extend the entire width of the vessel, and in some instances may even project out beyond the sides of the latter. The track may be straight or may be curved in a vertical plane, the end portions being at higher elevations than the center portion. The dead weight of the car and the primary control mounted thereon may be varied at will by the use of auxiliary weights 14 which may be increased or decreased in number to give the desired effect. These are preferably masses of lead so as to give the maximum weight for the minimum size.

The source of power or power storage element is in the form of a fly wheel 15 mounted on a shaft 16 extending transversely of the car so that the plane of rotation of the fly wheel remains constant during the back and forth movement of the car. Although the roll of the ship may be relied upon for maintaining the speed of rotation of the fly wheel, I preferably provide means for bringing the fly wheel up to speed, and maintaining it there. This preferably is in the form of an electric spinning motor 17 which may be coupled to the fly wheel or the shaft of the latter in any desired manner. As shown, it is in axial alignment with the fly wheel and directly on the shaft, but speed reducing gearing is preferably employed between the spinning motor and the fly wheel. Any suitable means may be employed for delivering current to the motor, irrespective of the position of the latter along the track. As shown, a pair of brushes 18 engage a pair of conductors 19 mounted parallel to the track 13. The motor 17 may be omitted or it may be used only for controlling the speed of the rotor by means of a solenoid brake with the motor acting as a generator.

The car is directly coupled to the vessel by suitable gearing, whereby the car may be positively moved to any desired position along the track and at any desired speed. The gearing between the car and the vessel is illustrated as a rack bar 20 secured to the vessel, parallel to the track, and a pinion 21 mounted on the car and gearing with the rack bar so that any rotation of the pinion results in a corresponding bodily movement of the car. Obviously the rack bar 20 might be replaced by a wire rope with its ends secured to the vessel at opposite sides, and the pinion 21 replaced by a drum around which the cable would make a few turns. Other mechanically equivalent connections between the car and the vessel might be employed. For transmitting power from the power storage element 15 to the gear element 21 I provide, as an important feature of my invention, a variable speed gear capable of transmitting power to the gear element in either direction from the one-way rotating fly wheel. This is preferably in the form of a hydraulic gear. This includes a variable stroke hydraulic pump 22 connected to the fly wheel through a gear 23 and pinion 24, and a fixed stroke fluid motor 25 connected to the pinion 21. The oil or other motive fluid is delivered from the pump to the motor, and from the motor back to the pump in a closed cycle by conduits 26 and 27. I have not illustrated the details of construction of the pump motor and connections, as such may be of any desired and well known type now on the market, such for instance as the Waterbury hydraulic gear, and I have not illustrated the desirable appurtenances such as safety valves, etc., as they form no portion of my present invention. The variable stroke hydraulic pump is of such a type that the stroke may be varied at will by the movement of a control member. This is illustrated as a reciprocatory spindle 28 which, when in neutral position, permits the pump rotor to turn at any speed without the development of fluid pressure or the establishment of any flow of fluid to and from the motor 25. The movement of the spindle to one side of neutral causes the rotation of the motor element in one direction and when on the other side of neutral the motor element rotates in the opposite direction. The distance to which the spindle is moved from neutral determines the speed transmission ratio, and the rapidity of movement determines the rate of acceleration or deceleration of the motor element. It is understood that the fly wheel 15 and the rotor of the hydraulic pump rotate constantly at substantially uniform speed. Thus, by the proper movement of the control spindle of the gear, the car may be moved at any desired speed and in either direction.

I provide means whereby this spindle may be conveniently operated irrespective of the speed or position of the car. This secondary control may be mounted on the car, and electrically operated, or it may be mounted stationary on the vessel. When mechanical means, separate from the car, is used, it has operating connections to the spindle. This is illustrated as a bell crank lever pivoted on the car with an arm 29 extending in an approximately horizontal direction, and connected to the spindle and a depending arm 30 having its free end movable transversely of the direction of movement of the car. This free end engages with a guide bar 31 extending parallel to the track, and mounted for bodily movement transversely of the direction of movement of the car. As the guide bar 31 is of a length approximately equal to the length of the track, it will be evident that a transverse bodily movement of the guide bar will operate the spindle and control the direction and speed transmission ratio of the hydraulic gear.

The fluid pressure in the hydraulic gear will vary with the torque, and I utilize an excess of pressure or torque for operating a brake and resisting or retarding the free movement of the car. The excessive pressure may result either during a rapid acceleration of the car when power is being transmitted from the fly wheel 15 to the gear 21, or it may result from a tendency of the car to move at a faster rate than that determined by the speed of the fly wheel and the position of the control spindle 28. Such a brake is shown in its simplest form as a brake drum 32 on the shaft of the gear 21, and against which a brake shoe 33 may operate. This brake shoe is carried by a bell crank lever 34 and is normally held out of engagement with the brake drum by a spring 35. A plunger 36 mounted in a cylinder 37 is connected to the lever 34, and the cylinder is connected to the fluid transmission pipes 26 and 27 by a pipe 38 and a shuttle valve 39. Thus an excess pressure either from the pump to the motor or from the motor to the pump will act to overcome the spring 35 and apply the brake. The spring 35 is adjustable so that the brake is not applied until the pressure exceeds a predetermined minimum. This auxiliary brake is only an example of braking by excess fluid pressure. Other auxiliary braking may or may not be employed.

As an additional safety measure I provide means for automatically and gradually moving the control spindle to neutral position as the car approaches the limiting position determining maximum amplitude. Adjacent to the opposite ends of the track there are provided a pair of guide plates lying in the path of movement of the depending end 30 of the spindle actuating bell crank lever. These guide plates are so designed and positioned that while the car is along the intermediate portion of its track the spindle may be moved in either direction to any desired extent from neutral. As shown, the guide plate 40 at one end of the track has a curved surface 41 in the path of movement of the bell crank lever, so that as the car approaches the end of the track the lever is gradually and automatically moved to neutral, although the guide plate does not prevent the lever from moving the spindle past neutral and start the car in the opposite direction. At the other end of the track there is a similar guide plate 40ª on the opposite side of the path of movement of the spindle actuating lever, and with its operating face 41ª serving to bring the spindle back from the other side to neutral. Although the guide plate 40ª is indicated in dotted lines at the left of Fig. 1, it will be evident that in practice the two guide plates may be spaced a long distance apart lengthwise, and be mounted only adjacent to opposite ends of the track.

Although the guide rod 31 may be moved back and forth manually, I preferably employ automatic mechanism for so moving the guide rod as to give the gear control spindle a harmonic or other motion in the period of the vessel's roll, so that the car constituting the active weight will perform a corresponding motion on the track, and will thus exert a rolling or quenching effect upon the vessel. If it be desired to utilize the device for establishing or creating a roll, as for instance in working the vessel off a sand bar, the bar 31 may be operated the same as in stabilizing or quenching a roll, except in different phase in respect to the athwartship motion of the vessel.

As a means for operating the guide rod 31 by the action of one or more gyroscopically controlled servo-motors, the guide rod is supported by a plurality of arms 43 from a rock shaft 44, and the latter is oscillated by means of a crank arm 45 mounted to swing back and forth through approximately a one-half revolution of a supporting crank shaft 46. The crank pin 47 is connected by a link 48 to a lever arm 49 on the rock shaft 44. The extent of movement of the link 48 and therefore of the guide rod 31 may be varied by varying the angular movement of the crank, and also by varying the crank radius. A simple construction whereby the crank radius may be varied is shown in detail in Figs. 6 and 7. The crank pin 47 is carried by a block 50 slidable lengthwise of the crank arm 45, one limiting position being such that the crank pin is in axial alignment with the crank shaft. The crank arm carries a screw shaft 51 held against longitudinal movement in respect to the crank arm by a pair of collars 52—53 and having threaded engagement with the crank pin block 50. By the rotation of this screw shaft the crank pin may be moved as desired. For rotating the screw shaft, the hub 53 is provided with a bevel pinion 54 meshing with a bevel gear 55 rotatably mounted on a hub 56 within which the crank shaft 46 rotates. Rigidly secured to the bevel gear 55 is a spur gear 57 meshing with a pinion 58 on a shaft 59 parallel to the crank shaft. The two shafts are mounted in suitable journals in a plate 60.

It will be noted that by rotating the crank shaft 46 the crank pin is caused to travel in a circular path, and that by rotating the shaft 59 the radius of this curved path may be decreased to zero or increased to the limit of the length of the crank arm 45.

For rotating the two shafts 46 and 59 I provide a pair of constant speed reversible electric motors. The main motor 62 is connected to the shaft 46 by speed reduction gearing shown particularly in Fig. 4. The motor has a pinion 63 meshing with a gear 64 on a counter shaft 65, and this shaft has a pinion 66 meshing with a gear 67 on the crank shaft 46. The other motor 68 which may be somewhat smaller has its shaft provided with a pinion 69 meshing with a gear 70 on the shaft 59.

The motor 62 is capable of operating in either direction and is controlled so that the crank shaft 46 is rotatable through only one-half a revolution. Thus the crank pin 47 may swing through approximately 180° and the link 48 has a harmonic motion and transmits that motion to the hydraulic gear controlling spindle 28, with the crank pin in outer limiting position. The spindle is reversed upon a reversal of the direction of movement of the motor 62. The motor 62 is controlled so that its reversals of direction of rotation synchronize with the vessel's roll and the direction of rotation of the motor and the direction of roll of the vessel reverse at substantially the same time. Obviously if the crank pin be in its inner limiting position, namely in alignment with the crank shaft, the motor 62 will not actuate the link 48 and the guide rod 31 will be held in central position, and the control spindle 48 in neutral position with the car locked against movement along the track. By varying the radius of the crank pin 47, the extent of movement of the hydraulic gear spindle 28 is varied, and the amplitude of movement of the car is controlled. The motor 68 is controlled in accordance with the amplitude of roll of the vessel, so that for slight ship roll the radius of movement of the crank pin 47 will be correspondingly small, and the car or active weight will have a comparatively short amplitude of movement.

Although the two motors may be manually controlled to give the desired character and range of movement to the crank pin and through it to the hydraulic gear spindle and the active weight, I prefer automatically to control the two motors. To accomplish this I preferably provide a Cardan 75 stabilized by a gyroscopic rotor 76 for an axis located fore and aft of the vessel. Thus, any rolling of the vessel causes a relative tilting of the Cardan about its journals 77. Secured to the Cardan or one of the projecting journals of the latter, is a gear segment 78 meshing with a pinion 79 on a shaft 80 mounted for rotation but otherwise fixed in respect to the vessel. This shaft 80 as oscillated by the relative tilting of the Cardan 75 operates to control switches for the two motors. I have not shown these switches in Fig. 3 as they would there appear on a comparatively small scale, but have shown them in detail and on a larger scale in Figs. 8, 9 and 10, and have shown the wiring diagram in Figs. 11 and 12. For controlling the main or crank arm operating motor 62 the shaft 80 is provided with a pair of arms 81 and 82, each having a knife switch 83 at one end, and a knife switch 84 at the opposite end, and adapted to engage with pairs of contacts 85 and 86 mounted on the base. The arms 81 and 82 are friction tight on the shaft, and when in neutral position, the contacts are broken, as shown in Fig. 9. A comparatively slight relative tilting of the Cardan 75 in respect to the vessel and a corresponding movement of the gear segment 78 will cause such a rotation of the shaft 80 as will bring either the contacts 83—85 or the contacts 84—86 together, depending upon the direction of movement of the Cardan and gear. A Cardan movement corresponding to a slight roll of the vessel in one direction will close the contacts at one end of the arms 81—82, for instance the contacts 83—85, as shown in Fig. 11, and these contacts are so connected to a source of electric energy and to the motor 62 that the motor will rotate in one direction. The wiring is such that if the Cardan and gear segment move in the opposite direction and the contacts 84—86 are closed, the current will flow to the motor 62 so as to cause the rotation of the latter in the opposite direction. As the shaft may turn through a number of revolutions during a swing of the gear segment 78, the switch arms 81—82 are only friction tight on the shaft 80, and if the circuit is closed, the gear segment may continue moving and the shaft 80 continue rotating in the same direction without affecting the condition of the contacts. The instant that the ship starts to right itself after the angular movement in one direction has stopped, and the Cardan starts in the opposite direction, and the reverse movement of the gear segment 78 will instantly cause such movement of the switch arms as to break the circuit on one side and close it on the other and start the reverse rotation of the motor 62. Thus, the reversal of the motor takes place when the ship starts to right itself in its roll, and upon the resulting reversal of movement of the Cardan. The friction connections between the switch arms and the shaft 80 should be such as to insure the movement of the switch arms with the shaft into proper engagement with the contacts 85 and 86, but should not be so great as to offer very material resistance to the movement of the gear segment 78 and Cardan 75. This friction may be made adjustable by adjustable spring clamps 87.

As the contacts 83 and 85 or the contacts 84 and 86 may remain in engagement for a period greater than that required for the motor to swing the crank, more than approximately 90° from neutral or intermediate position, I provide limit switches for breaking the circuit, irrespective of the position of the switches 83—84 when the crank has been brought to a predetermined angular position. As shown, there are provided a pair of switches 88—89 which may be of the ordinary single-pole type and normally held closed by suitable springs 90. These two switches have operating arms 91—92 presenting cam faces in the path of stops 93—94 carried by the shaft 46. If the shaft 46 rotates in one direction through more than approximately 90° from the position shown in Fig. 3, the stop 93 will engage the cam face of the switch lever 91 and open the switch 88, thus stopping the motor. If it rotate through approximately more than 90° in the opposite direction from that shown in Fig. 3, the stop 94 will engage the cam face of the switch arm 92 and open the switch 89, thus stopping the motor. The stops 93 and 94 are preferably in the form of pins carried by a plate 95 secured to the shaft 46 and the plate has provision for the attachment of the stop pins in different positions, so as to vary the action of the switches 88 and 89 in respect to the position of the crank. The switches 88 and 89 may be at any desired position in the motor circuit. They are conventionally illustrated in Fig. 11, as being in the two branches of one of the feed wires.

The shaft 80 which is oscillated by the Cardan and gear segment, also has switch contacts for controlling the amplitude controlling motor 68. With the Cardan in normal stationary position the crank pin should be centered. When the vessel has a wide angle of roll or athwartship motion, it is desired that the crank pin be kept at the maximum radius. The contacts for this purpose include a pair of brush-carrying arms 97—98, friction tight on the shaft 80 and having the brushes thereof coacting with curved surfaces presenting contacts 99—100 and 101. The contact 100 is centralized, while the contacts 99 and 101 are at the extremities of the path of movement of the brush holders. Stops 102 may be mounted in the path of the brush holders so as to limit the angular movement of the latter. The friction connection of the brush holders to the shaft 80 permits the brushes to remain on the contacts 99 or 101 during a further rotation of the shaft 80 in the same direction. The contacts 99 and 101 are arranged in pairs and are so connected in the circuit that when the brushes are in engagement with either pair, the motor will be energized and rotate in the same direction. The intermediate contacts 100 also include a pair, and these are connected reversely in the circuit so that when the brushes are in engagement with these contacts the motor will rotate in the opposite direction. The wiring may be substantially as illustrated in Fig. 12. With the brush holders in central position and on the contacts 100, the motor 68 will be energized so as to bring the crank pin into alignment with the crank. For very low amplitude rolls the brushes will stay on the contacts 100, or at least will not engage the contacts 99 and 101. Thus the crank pin stays centered. With the maximum roll, or at least when the roll exceeds a predetermined angular limit, the brushes will be on the contacts 99 or 101 most of the time and will only momentarily engage the contact 100 in passing through. Thus the motor will be energized to keep the crank at its maximum throw. During intermediate conditions the brushes moving back and forth over the contacts will average the throw of the crank in accordance with the amplitude of roll of the vessel. Any suitable means may be employed for varying the friction connections between the shaft 80 and the brushes. I have shown a spring 103 and nut for varying the tension thereof.

The circuit of the motor 68 which includes the brushes 97 and contacts 99, 100, and 101, also includes limit switches for cutting out the motor when the crank reaches its limiting position. This may include a non-rotatable nut or switch actuator 104 threaded on the shaft 59. As the shaft rotates, the member 104 is moved back and forth depending upon the direction of rotation of the shaft. A pair of switches 105 and 106 are mounted with their switch levers or arms in the path of movement of the member 104 and upon opposite sides and normally held in closed position in any suitable manner, as for instance by springs. The pitch of the thread on the shaft 59 is such in respect to the position of the switch arms that when the crank pin reaches one limiting position the member 104 will open the switch 105, and when the crank pin reaches its opposite limiting position the member 104 will open the switch 106. These switches may be arranged in series in any part of the circuit of the motor 68. They are diagrammatically illustrated in Fig. 12 as being in one of the feed wires.

The guide plates 40 and 40ª at times limit or prevent movement of the spindle actuating lever 30, and as this may occur at a time when the motor 62 is operating to move the guide rod 31 in opposite to the action of the guide plates, I provide safety means in the form of resilient connections in the link 48. One section 108 of the link is provided with a pair of loose collars 109—110 mounted thereon and normally pressed apart by a coil spring 111 into engagement with the stops 112 and 113. The other section of the link 114 has flanges engaging with the opposite outer surfaces of the two collars 109 and 110. The spring 111 is of such strength as to withstand any normal load and cause the two sections 108 and 114 of the link to move as a unit. In case of excessive load either in the form of pull or push on the section 114, this will be taken care of by a compression of the spring 111. Obviously this is merely one form of yielding connection which might be employed.

The main or basic idea of my invention is the imparting of simple harmonic motion to a weight or mass capable of motion athwartship and by means of and controlled by the power of a fly wheel or other high speed source of power coupled at a variable rate to both the active weight and the vessel structure for the purpose of controlling or influencing the motions of a vessel, that is, for stabilizing rolling, and roll conditioning. Although many of the features incorporated in the preferred embodiment hereinbefore described are important, the specific location of the parts in most instances is not of vital importance. For instance the Cardan and switches operated thereby are illustrated as incorporated in the casing which includes the motors and crank actuating and controlling mechanisms. Obviously this Cardan and switches might be mounted remote from the motors and motor actuated parts, and in fact all of the parts constituting the secondary control except the Cardan and switches might be mounted directly on the car 10 and form a part of the active weight. In such a construction the crank motion might be imparted to the lever arm 30 by a comparatively short link corresponding to the link 48.

Having thus described my invention, what I claim as new and desire to secure by Letters Patent is:—

1. The method of stabilizing a ship against rolling movement by means of an active weight, which includes imparting to the weight a back and forth movement in an athwartship direction in timed relationship to the roll of the ship, substantially uniformly accelerating said movement from one extreme position to midship position, and substantially uniformly decelerating said movement from midship position to the opposite extreme position, and reversing the direction of movement of the weight when the ship starts to right itself from extreme position in its roll, whereby the weight crosses midship position at maximum velocity when the ship is on even keel.

2. The method of stabilizing a ship against rolling movement by means of an active weight, which includes imparting to the weight a back and forth movement in an athwartship direction in timed relationship to the roll of the ship, and reversing the direction of movement of the weight when the ship starts to right itself from extreme position in its roll, whereby the weight crosses midship position when the ship is on even keel.

3. The method of stabilizing a ship against rolling movement by means of an active weight, which includes imparting to the weight a back and forth movement in an athwartship direction in timed relationship to the roll of the ship, reversing the direction of movement of the weight when the ship starts to right itself from extreme position in its roll, whereby the weight crosses midship position when the ship is on even keel, and varying the amplitude of movement of said weight in accordance with the angle of roll of the ship.

4. A ship stabilizer including a track extending in an athwartship direction, an active weight movable along said track and including means for imparting movement to the weight, and means separate from said weight for controlling the velocity of the weight to give substantially uniform acceleration from one extreme position to midship position, and substantially uniform deceleration from midship position to the opposite extreme position.

5. A ship stabilizer including a track extending in an athwartship direction, an active weight movable along said track and including means for imparting movement to the weight, and means separate from said weight for reversing the direction of movement of the weight when the ship is at the end of its angular movement in the roll.

6. A ship stabilizer including a track extending in an athwartship direction, an active weight movable along said track and including means for imparting movement to the weight, and means separate from said weight for controlling the velocity of the weight to give substantially uniform acceleration from one extreme position to midship position, and substantially uniform deceleration from midship position to the opposite extreme position, and means for reversing the direction of movement of the weight when the ship is at the end of its angular movement in the roll.

7. A ship stabilizer including a track extending in an athwartship direction, an active weight movable along said track and including means for imparting movement to the weight, means separate from said weight for controlling the velocity of the weight to give substantially uniform acceleration from one extreme position to midship position, and substantially uniform deceleration from midship position to the opposite extreme position, and means for varying the amplitude of movement of the weight in accordance with the extent of angular movement of the ship in its roll.

8. A ship stabilizer including an active weight, a substantially constant speed and one-way rotating prime mover, and variable speed transmission means for imparting to the weight a back and forth movement in an athwartship direction.

9. A ship stabilizer including an active weight, a one-way rotating fly wheel rotor, and variable speed transmission means for imparting to the weight a back and forth movement in an athwartship direction.

10. A ship stabilizer including an active weight, a fly wheel rotor, and means for transmitting power from said rotor to said weight to impart to the latter back and forth movement in an athwartship direction.

11. A ship stabilizer including an active weight, a fly wheel rotor, and means for transmitting power from said rotor to said weight to impart to the latter back and forth movement in an athwartship direction, at varying velocity and of variable amplitude.

12. A ship stabilizer, including an active weight having a one-way rotating fly wheel rotor constituting a part thereof, and power transmitting means between said rotor and the ship for imparting back and forth movement to the weight.

13. A ship stabilizer including an active weight including a high speed one-way rotating rotor as a part thereof, and a variable and reversible speed transmitter connecting said rotor and the vessel.

14. A ship stabilizer including an active weight, a prime mover and a variable speed hydraulic gear driven by said rotor for imparting movement to said weight.

15. A ship stabilizer including an active weight, a prime mover and a variable speed hydraulic gear driven by said rotor for imparting movement to said weight, said rotor and gear forming a part of the active weight.

16. A ship stabilizer including an active weight, a prime mover, a variable speed gear movable with the weight and means along the path of movement of the weight for operating the gear to control the direction of movement of the weight.

17. A ship stabilizer including an active weight, a prime mover, a variable speed gear movable with the weight and means along the path of movement of the weight for operating the gear to control the direction of movement and speed of the weight.

18. A ship stabilizer including an active weight, a one-way rotating source of power constituting a part of the weight, a reversing gear also forming part of the weight, and means in the path of movement of the weight for operating said reversing gear.

19. A ship stabilizer including an active weight, a one-way rotating source of power and a variable speed gear both forming a part of the weight.

20. A ship stabilizer having an active weight including as a part thereof a one-way rotating source of power and a variable speed reversing gear for operatively connecting the source of power and the vessel to control the speed and direction of movement of the weight.

21. A ship stabilizer having an active weight including as a part thereof a one-way rotating source of power and a hydraulic variable speed reversing gear for operatively connecting the source of power and the vessel to control the speed and direction of movement of the weight.

22. A ship stabilizer having an active stabilizing weight, a one-way rotating source of power and a variable speed transmission device operating to transmit power from said source during acceleration of said weight and from the weight to the source of power during deceleration of said weight.

23. A ship stabilizer including a car movable back and forth in an athwartship direction, a one-way rotating prime mover carried by said car, and variable speed power transmitting mechanism connecting said prime mover to the ship for moving said car.

24. A ship stabilizer including a car movable back and forth in an athwartship direction, a one-way rotating prime mover carried by said car, and reversible power transmitting mechanism connecting said prime mover to the ship for moving said car.

25. A ship stabilizer including a car movable back and forth in an athwartship direction, a one-way rotating source of power carried thereby, gear connections between the car and the ship, and a reversible variable speed hydraulic power transmission between said source of power and said connections.

26. A ship stabilizer including a car movable back and forth in an athwartship direction, a source of power carried thereby, gear connections between the car and the ship, a reversible variable speed hydraulic power transmission between said source of power and said connections, and means in the path of movement of the car for controlling said transmission.

27. A ship stabilizer including an active weight movable back and forth in an athwartship direction, a source of power forming a portion of said weight, gear connections between said weight and the ship, and including a direction reversing element, and means in the path of movement of said weight for operating said element.

28. A ship stabilizer including an active weight movable back and forth in an athwartship direction, and having a source of power as a part thereof, a variable speed reversible power transmission mechanism operated from said source of power, and connections from said mechanism to the vessel for preventing bodily movement of the weight when the power transmission mechanism is in neutral.

29. A ship stabilizer including an active weight movable back and forth in an athwartship direction, and having a source of power as a part thereof, a variable speed reversible power transmitting mechanism operated from said source of power, and connections from said mechanism to the vessel for preventing bodily movement of the weight when the power transmitting mechanism is in neutral and positively controlling the speed of movement in accordance with the transmission ratio of said mechanism.

30. A ship stabilizer including an active weight movable back and forth in an athwartship direction, a one-way rotating prime mover, gear connections between the weight and the vessel, and variable speed power transmitting mechanism between said source of power and said gear connections.

31. A ship stabilizer including an active weight movable back and forth in an athwartship direction, a one-way rotating prime mover, gear connections between the weight and the vessel, variable speed power transmitting mechanism between said source of power and said gear connections, and means for controlling said mechanism to impart to the weight harmonic motion in the period of the ship's roll.

32. A ship stabilizer, including an active weight movable back and forth in an athwartship direction, gearing connections between the weight and the vessel, a source of power, variable speed reversible hydraulic power transmitting connections between said source of power and said bearing for positively controlling the direction and speed of movement of said weight.

33. A ship stabilizer, including an active weight movable back and forth in an athwartship direction, gearing connections between the weight and the vessel, a source of power, variable speed reversible hydraulic power transmitting connections between said source of power and said bearing for positively controlling the direction and speed of movement of said weight, said prime mover and said connections forming a part of said weight.

34. A ship stabilizer, including an active weight movable back and forth in an athwartship direction, gearing connections between the weight and the vessel, a source of power, variable speed reversible hydraulic power transmitting connections between said source of power and said bearing for positively controlling the direction and speed of movement of said weight, said prime mover and said connections forming a part of said weight, and means extending along the path of movement of the weight and movable to control said connections.

35. A ship stabilizer including an active weight movable back and forth in an athwartship direction, a one-way rotating source of power, variable speed reversible driving connections connecting said source of power, said weight, and the vessel for controlling the speed and direction of movement of the weight.

36. A ship stabilizer including an active weight movable back and forth in an athwartship direction, a source of power, variable speed reversible driving connections connecting said source of power, said weight, and the vessel for controlling the speed and direction of movement of the weight, and a gyroscope for controlling said connections in accordance with the ship roll.

37. A ship stabilizer including an active weight movable back and forth in an athwartship direction, a one-way rotating prime mover, a variable speed hydraulic gear including a pump part, a motor part, and a controlling member for varying the speed and direction of rotation of the motor part, and means operated by the motor part for positively moving said weight in accordance with the speed and direction of rotation of said motor part.

38. A ship stabilizer including an active weight movable back and forth in an athwartship direction, a prime mover, a variable speed hydraulic gear including a pump part, a motor part, and a controlling member for varying the speed and direction of rotation of the motor part, and means operated by the motor part for positively moving said weight in accordance with the speed and direction of rotation of said motor part, said prime mover and motor part forming a part of said weight.

39. A ship stabilizer including an active weight movable back and forth in an athwartship direction, a prime mover, a variable speed hydraulic gear including a pump part, a motor part, and a controlling member for varying the speed and direction of rotation of the motor part, means operated by the motor part for positively moving said weight in accordance with the speed and direction of rotation of said motor part, and a member extending along the path of movement of said weight for operating said controller, irrespective of the position of the weight.

40. A ship stabilizer including an active weight movable back and forth in an athwartship direction, a prime mover, a variable speed hydraulic gear including a pump part, a motor part, and a controlling member for varying the speed and direction of rotation of the motor part, means operated by the motor part for positively moving said weight in accordance with the speed and direction of rotation of said motor part, a member extending along the path of movement of said weight for operating said controller, irrespective of the position of the weight, and a gyroscope for moving said member in accordance with the ship roll.

41. A ship stabilizer including an active weight movable back and forth in an athwartship direction, a one-way rotating constant energy source, a powerful hydraulic variable speed gear for connecting said source and said weight, and a gyroscope for controlling the operation of said gear.

42. A ship stabilizer including an active weight movable back and forth in an athwartship direction, and having means forming a part thereof for positively moving said weight and controlling its speed and direction, a primary controller on said weight, and means extending along the path of movement of the weight for operating the primary controller.

43. A ship stabilizer including an active weight movable back and forth in an athwartship direction, a one-way rotating source of power, a variable speed reversible gearing connection connecting the weight, vessel and prime mover, a primary controller on said weight for said gear connection, and means extending along the path of movement of said weight for operating said primary controller.

44. A ship stabilizer including an active weight movable back and forth in an athwartship direction, a source of power, a variable speed reversible gearing connection connecting the weight, vessel and prime mover, a primary controller on said weight for said gear connection, and means adjacent to the opposite ends of the path of movement of the weight for positively bringing said controller to neutral position and stopping the weight.

45. A ship stabilizer including an active weight movable back and forth in an athwartship direction, a source of power, a variable reversible gearing connection between said weight, said source of power, and the vessel, a primary controller on the vessel for said gearing connection, means extending along the path of movement of the weight for operating said primary controller, and a secondary controller operating in accordance with the ship roll for operating said last mentioned means.

46. A ship stabilizer including an active weight movable back and forth in an athwartship direction, a source of power, connections between said source of power and said weight for positively controlling the speed and direction of movement of the weight, a primary controller and weight, a member extending along the path of movement of the weight for operating said primary controller, and a gyroscope for operating said member.

47. A ship stabilizer including an active weight, a one-way rotating source of power, a variable speed reversible driving connection between the weight, the source of power and the vessel for controlling the position, speed and direction of movement of the weight, and a gyroscope for controlling said driving connection.

48. A ship stabilizer including an active weight, a one-way rotating source of power, a variable speed reversible driving connection between the weight, the source of power and the vessel for controlling the position, speed and direction of movement of the weight, and a gyroscope for controlling said driving connection to impart to the weight harmonic motion in the period of the ship roll.

49. A ship stabilizer including an active weight, movable back and forth in an athwartship direction, a member extending along the path of movement of the weight, means controlled by said member for positively moving said weight at varying speed and in either direction, and a gyroscope for operating said member.

50. A ship stabilizer including an active weight movable back and forth in an athwartship direction, a member extending along the path of movement of the weight, means controlled by said member for positively moving said weight at varying speed and in either direction, and an oscillatory crank arm of variable throw for operating said member.

51. A ship stabilizer including an active weight movable back and forth in an athwartship direction, a member extending along the path of movement of the weight, means controlled by said member for positively moving said weight at varying speed and in either direction, an oscillatory crank arm of variable throw for operating said member, an electric motor for operating said crank arm, a second electric motor for varying the throw of the crank, and a gyroscope for controlling the operation of both motors.

52. A ship stabilizer including an active weight, power means for positively moving said weight back and forth in an athwartship direction and at varying speed, and a controller including an oscillatory crank of variable throw and a gyroscope for controlling the degree of oscillation and the extent of throw of the crank.

53. A ship stabilizer including an active weight, power means for positively moving said weight back and forth in an athwartship direction and at varying speed, and a controller including an oscillatory member, an electric motor for oscillating said member, and a gyroscope for varying the degree of oscillation.

54. A ship stabilizer including an active weight, power means for positively moving said weight back and forth in an athwartship direction and at varying speed, and a controller including an oscillatory member, a reversible prime mover for oscillating said member, and a gyroscope for controlling the direction of rotation of said prime mover.

55. A ship stabilizer including an active weight, power means for positively moving said weight back and forth in an athwartship direction and at varying speed, and a controller including a crank arm of variable throw, an electric motor, means operated by said motor for varying the throw of said crank, and a gyroscope for controlling said motor.

56. A ship stabilizer including an active weight, power means for positively moving said weight back and forth in an athwartship direction and at varying speed, and a controller including an oscillatory member of variable throw, an electric motor for oscillating said member, a second electric motor for varying the throw of said member, and means for stopping and starting said motors in accordance with the ship roll.

57. A ship stabilizer including an active weight, power means for positively moving said weight back and forth in an athwartship direction and at varying speed, and a controller including an oscillatory member, an electric motor for oscillating said member, and a gyroscope for reversing the direction of rotation of said motor upon reversal of the direction of ship roll.

58. A ship stabilizer including an active weight, power means for positively moving said weight back and forth in an athwartship direction and at varying speed, and a controller including an oscillatory member and a gyroscope for reversing the direction of oscillation upon reversal of direction of ship roll.

59. A ship stabilizer including an active weight, power means for positively moving said weight back and forth in an athwartship direction and at varying speed, a controller including a servo-motor and a gyroscope controlling the latter.

60. A ship stabilizer including an active weight, power means for positively moving said weight back and forth in an athwartship direction and at varying speed, a controller including a servo-motor, a gyroscope controlling the latter, and means adjacent to the ends of the path of movement of the weight for slowing down and positively stopping the weight independently of the action of the servo-motor.

61. A ship stabilizer including an active weight, power means for positively moving said weight back and forth in an athwartship direction and at varying speed, and a controller including an oscillatory member, an electric motor for oscillating said member, a switch for controlling the motor, and a gyroscope for operating the switch.

62. A ship stabilizer including an active weight, power means for positively moving said weight back and forth in an athwartship direction and at varying speed, and a controller including an oscillatory member, an electric motor for oscillating said member, a switch for controlling the motor, a gyroscope for operating the switch, and an independent switch for stopping the motor after predetermined operation independently of the action of the gyroscope.

63. A ship stabilizer including an active weight, power means for positively moving said weight back and forth in an athwartship direction and at varying speed, and a controller including an oscillatory member, a servo-motor for operating the same, a gyroscope for controlling the servo-motor, and independent means for stopping the servo-motor after predetermined operation independently of the action of the gyroscope.

64. A ship stabilizer including an active weight movable back and forth in an athwartship direction, a source of power, and driving connections between said source of power and the vessel for positively controlling the movement of the weight, varying its speed and direction, and a brake operating automatically to limit the application of power to said weight.

65. A ship stabilizer including an active weight movable back and forth in an athwartship direction, a source of power, gearing connections between said source of power, weight, and the vessel, including a hydraulic power transmitter having a pump part and a motor part, a brake for the motor part, and means for automatically applying said brake when the fluid pressure between the pump part and motor part exceeds a predetermined limit.

66. A ship stabilizer including an active weight movable back and forth in an athwartship direction, a fly-wheel carried by and forming a part of the weight, gearing between the weight and the vessel, and hydraulic power connections including a pump part driven by said fly-wheel, a motor part for driving said gearing, a controller for varying the relative speed and direction of the motor part in respect to the pump part, an oscillatory member extending lengthwise of the path of movement of the weight for operating said member, a variable throw crank for operating said member, an electric motor for oscillating said crank, an electric motor for varying the throw of said crank, and a gyroscope for controlling the operation of both of said motors.

67. A device for exerting rolling torques on ships comprising a mass movable back and forth across the ship, a gyroscope and means controlled by the relative position of said gyroscope and of the mass in its path of travel for governing the rate of movement of said mass.

68. A device for exerting rolling torques on a ship comprising a car movable back and forth across the ship, means for accelerating and braking the car, a control gyroscope, and a controller governed jointly by said gyroscope and the position of the car in its path of travel for governing said accelerating and braking means.

69. A ship stabilizer having a member movable about a fixed axis, a second member carried by said first mentioned member and movable radially thereof, an electric motor for moving the first mentioned member about its axis, a separate reversible electric motor for moving said second mentioned member in and out along the first mentioned member and a gyroscope for controlling the circuit of the first mentioned motor.

70. A ship stabilizer having a member movable about a fixed axis, a second member carried by said first mentioned member and movable radially thereof, an electric motor for moving the first mentioned member about its axis, a separate reversible electric motor for moving said second mentioned member in and out along the first mentioned member, and a gyroscope for controlling the circuit of the second mentioned motor.

71. An apparatus for damping ship roll by movement of a weight to one side or the other of the vertical, longitudinal, medial plane of the ship, said apparatus including a member movable about a fixed axis, a second member carried by said first mentioned member and movable radially thereof, an electric motor for moving the first mentioned member about its axis, a separate reversible electric motor for moving said second mentioned member, in and out along the first mentioned member, and gyroscope means for controlling the circuits of said motors.

72. An apparatus for damping ship roll by movement of a weight to one side or the other of the vertical, longitudinal, medial plane of the ship, said apparatus including a member movable about a fixed axis, a second member carried by said first mentioned member and movable radially thereof, an electric motor for moving the first mentioned member about its axis, a separate reversible electric motor for moving said second mentioned member in and out along the first mentioned member, means controlled by the movement of the ship in its roll for controlling said motors to keep the movement of the first mentioned member in phase with the ship's roll and to vary the distance of the second mentioned member from the center of movement of the first mentioned member, in accordance with variations in the amplitude of the ship's roll.

73. A ship stabilizer including a track extending upon both sides of the vertical, longitudinal, medial plane of the ship, a car movable along the track, a rack bar parallel to the track, a source of power carried by said car, gearing connecting said source of power and said rack bar for positively propelling the car, and a controller mounted independently of the car for maintaining the movement of the car in phase with the roll of the ship and controlling the speed of said car whereby the rate of movement of the weight away from said medial plane continuously decreases as the distance of the weight from said plane increases.

74. A ship stabilizer including a track extending upon both sides of the vertical, longitudinal, medial plane of the ship, a car movable along the track, a rack bar parallel to the track, a source of power carried by said car, gearing connecting said source of power and said rack bar for positively propelling the car, means for controlling the car to maintain its movements in phase with the roll of the ship, and a brake operating automatically for retarding the speed of the car when the car exerts a predetermined force tending to drive said source of power.

Signed at New York city in the county of New York and State of New York this 18th day of August, A. D. 1922.

CARL L. NORDEN.